April 30, 1935.  F. W. PETERSON  1,999,616
PHOTOGRAPHIC COPYHOLDER
Filed Nov. 22, 1933  2 Sheets-Sheet 1

INVENTOR.
FREDERICK W. PETERSON
BY
ATTORNEYS.

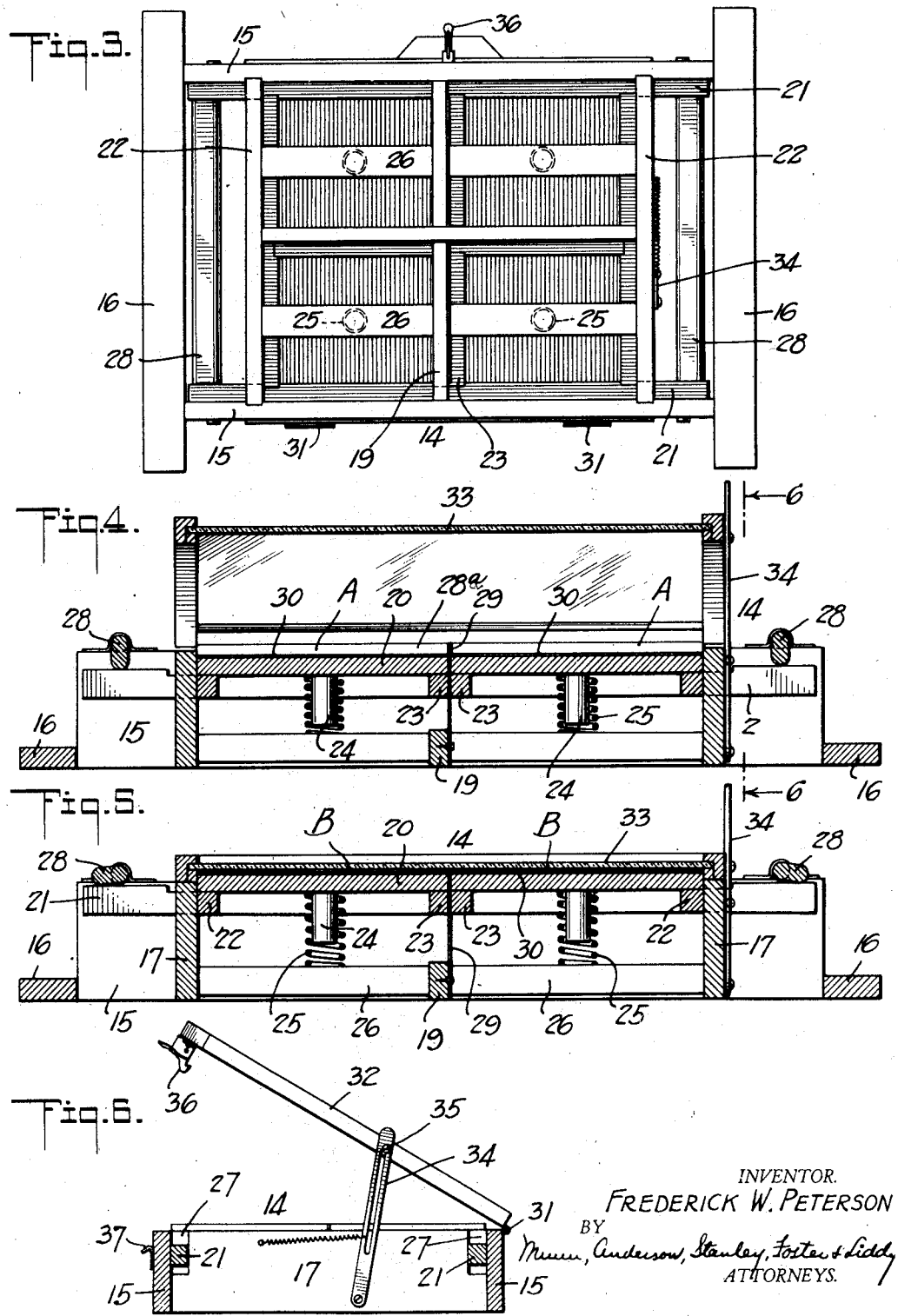

Patented Apr. 30, 1935

1,999,616

UNITED STATES PATENT OFFICE 1,999,616

PHOTOGRAPHIC COPYHOLDER

Frederick W. Peterson, Los Angeles, Calif.

Application November 22, 1933, Serial No. 699,248

1 Claim. (Cl. 88—24)

This invention relates generally to the class of photography, and same is more particularly directed to improvements in copy holders or frames for use in connection with that type of camera commonly employed by commercial copyists.

The invention has for its primary object the provision of a decidedly novel form of copyholder by means of which the originals of certificates, letters, documents, public records and the like, the sizes of which are substantially the same, may be disposed in such relationship to the lens of a commercial photo copying camera as to enable a number thereof to be simultaneously photographed upon a single sheet of photographic sensitized paper, and in such manner and by the employment of means whereby, when the sheet is developed, the photographic copies of the respective subjects contained thereon will be accurately separated from each other by definite lines of demarcation, along which lines the sheet can be readily and accurately cut into sections, each being a true copy of one of the subjects photographed.

With the above objects in view, together with others which will appear as the description proceeds, the invention resides in the novel combination and arrangement of parts, all as will be more fully described hereinafter, illustrated in the drawings, and particularly pointed out in the claim.

In the drawings:

Figure 3 is a bottom plan view of my complete frame assembly;

Figure 4 is a longitudinal section through said frame assembly showing the transparent panel adjusted to a position to enable one to readily gain access to the subject holding compartments;

Figure 5 is a view simiar to Figure 4, showing the transparent panel fully lowered and firmly pressed against the subjects to be copied; and Figure 6 is a section taken on the line 6—6 of Figure 4.

In municipalities of any appreciable size the task of copying, by photographic process, the originals of birth and death certificates and various documents or subjects has been both costly and laborious, due primarily to the fact that they were photographed and developed separately.

I have devised novel and accurately functioning means whereby a suitable number of the subjects to be copied can be rapidly arranged by a commercial copyist and disposed with respect to the lens of a commercial copying and developing machine, whereby the subjects can be simultaneously photographed upon a sheet of photographic sensitized paper and afterward cut so as to divide same into portions of corresponding sizes, each constituting a true copy of the original subject photographed. Any well known form of copying machine may be employed when carrying my invention into practice and the one herein conventionally illustrated is shown to include a camera 10 of the bellows type whose lens 11 is operatively positioned above the copy board or table 12. It is upon this board or table that 15 the subject to be photographed is intended to be placed preparatory to making an exposure, and it will be observed that I have secured thereto the parallel spaced apart cleats 13.

Figure 1:
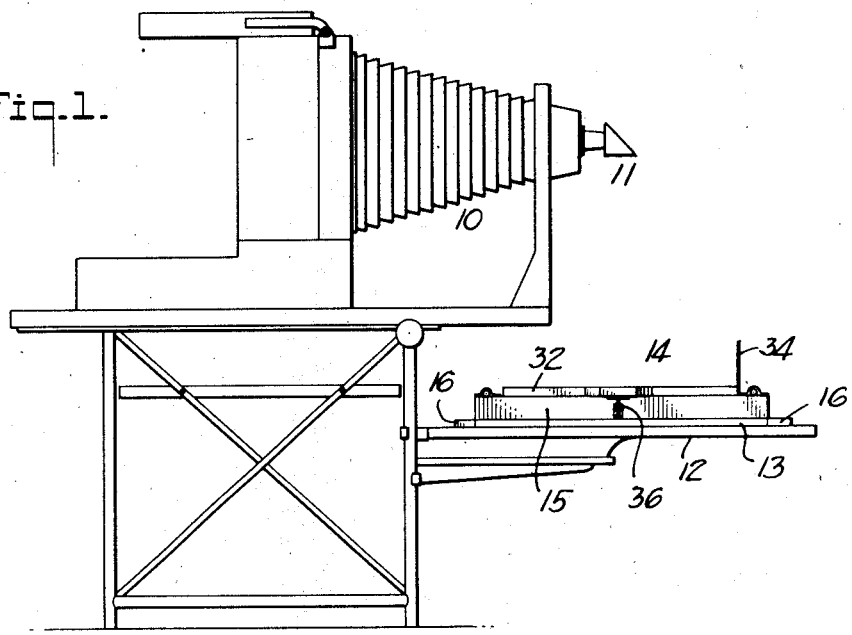
Figure 1 is a view in side elevation of a camera, showing my invention applied thereto.
Figure 2:
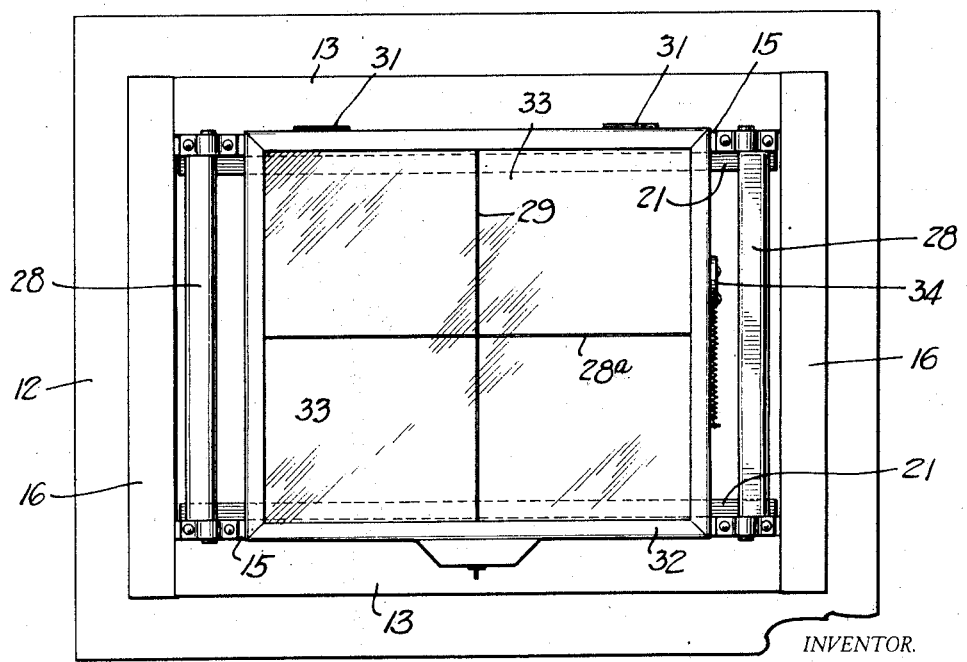
Figure 2 is a plan view of the table showing the frame in a position thereon preparatory to photographing a plurality of subjects.

My improved copy holder 14 comprises two longitudinally extending bars 15—15, transverse end bars 16—16; transverse spaced apart bars 17—17; longitudinal reinforcing bars 18 and a transverse bar 19. These structural elements mutually coact to provide a base structure wherein the inner faces of the bars 16 at points adjacent to ends of the latter are adapted to come flatwise against the adjacent ends of the bars 13—13 as clearly shown in Figures 1 and 2 of the drawings, whereby the said base structure will be held in a relatively fixed position on the table 12.

A vertically movable platform 20 is carried by the aforementioned base structure and same includes the longitudinal bars 21—21 to which are connected the end transverse bars 22—22 and the closely related intermediate transverse bars 23—23. The platform 20 is fixed to the bars 22—22 and 23—23, and same is of rectangular shape in plan so as to come squarely within the rectangular space defined by the coacting bars 15—15 and 17—17. Depending from the platform are studs 24 and extending about said studs are coil platform elevating springs 25. The lower ends of these springs rest upon the fixed frame bars 26 and their opposite ends bear firmly against the under side of said platform as shown in Figures 4 and 5 of the drawings. The ends of the bars 21 pass through vertical guide slots 27 in the bars 17 in order that the platform may be operatively raised and lowered as desired. Cam members 28—28 are mounted on the bars 15 and the bars 21 so that when the cams occupy the positions shown in Figure 4, the platform will be depressed against the normal actions of the springs 25. When the cams are turned to the positions shown in Figure 5, the platform will be yieldingly urged in an upward direction. In this connection, it will be observed on reference to Figure 5 that when the platform is fully elevated, the upper surface thereof is disposed slightly above the upper edges of the bars 15 and 17.

The base structure of the holder carries vertically disposed thin metallic partition plates 28a and 29. These plates are arranged at right angles to each other and same freely pass edgewise through the platform and their upper edges coact with the upper surface of the platform so as to subdivide said surface into a plurality of rectangular shallow compartments A of corresponding sizes, there being four of such compartments in the form of the invention herein illustrated. Each of these compartments is faced on its bottom with felt or the like 30.

Hinged at 31 to one of the bars 15 is a frame 32 to which is secured a transparent panel 33. A spring actuated latching link 34 is pivotally connected with the adjacent bar 17 and same is adapted to coact with the stud 35 on the frame 32 so as to hold the latter elevated as shown in Figure 6, at which time access may be gained to the aforesaid compartments A. When the frame 32 is lowered as shown in Figure 5, the latch 36 thereof may be engaged with the keeper 37 on the underlying bar 15, at which time the panel 33 will cause the platform to be yieldingly lowered so that the under surface of the panel will come in flat pressing engagement with the subjects B. This is obviously assuming that the cams 28 are in the positions shown in Figure 5. The subjects B, for the purpose of illustration, may be birth or death certificates or other original records, and same are of shapes agreeing with the form of the rectangular compartments A. When these certificates are placed in said compartments, the upper edges of the metallic strips 28a and 29 accurately separate the certificates from each other so that when photographic copies thereof are made upon a single sheet of sensitized photographic paper, the edge portions of said strips 28a and 29 will define definite lines of demarcation thereon which separate one copy from another.

A camera such as conventionally illustrated herein may of course be loaded with sensitized photographic paper in rolls of any desired width. After a predetermined length of the paper has been exposed when using my invention to obtain the desired number of copies, same, when developed and dried in the usual manner, may be readily cut along the lines of demarcation which will be formed upon the paper in the manner aforestated. If desired, any number of strips of paper may be permitted to accumulate as they are withdrawn from the camera, and same may be then uniformly arranged to form a stack of suitable thickness, at which time the entire stack may be cut along the said lines of demarcation so that in one operation the copies may be properly separated from each other and sorted.

I claim:

A photographic copyholder comprising a base structure including a pair of longitudinal bars connected together at their ends by transverse bars, a vertically movable platform disposed between said first and second bars, a pair of right-angular thin linear plates carried by said base structure and co-acting with the upper surface of the platform to divide said platform into an equal number of corresponding compartments in which the subjects to be photographed can be placed so as to enable the upper edges of said plates to form visible lines of demarcation between the subjects, and a transparent panel co-acting with the platform to enable the subjects to be firmly clamped between the platform and said panel and the said upper edges of said plates to be clearly visible therethrough while in close contact with the under surface of said panel.

FREDERICK W. PETERSON.